United States Patent
Thomas et al.

[19]

[11] Patent Number: 6,108,417
[45] Date of Patent: Aug. 22, 2000

[54] TELEPHONE HAVING A KEYPAD COVER

[75] Inventors: Raju Thomas, Carlsbad; Richard Stange; Brian Rentschler, both of Oceanside, all of Calif.

[73] Assignee: Denso Corporation, Japan

[21] Appl. No.: 09/181,629

[22] Filed: Oct. 28, 1998

[51] Int. Cl.[7] .................................................. H04M 1/00
[52] U.S. Cl. ............................................................ 379/433
[58] Field of Search .................................... 379/433, 428, 379/434; 455/575, 90; 16/386, 388, 374, 375, 319, 327, 262, 263, 380, 303

[56] References Cited

U.S. PATENT DOCUMENTS

| | | | |
|---|---|---|---|
| 4,897,873 | 1/1990 | Beutler et al. | 379/433 |
| 5,111,503 | 5/1992 | Takagi | 379/433 |
| 5,257,310 | 10/1993 | Takagi et al. | 379/433 |
| 5,930,353 | 7/1999 | Lee et al. | 379/433 |

*Primary Examiner*—Jack Chiang
*Attorney, Agent, or Firm*—Fish & Richardson P.C.

[57] ABSTRACT

A telephone is provided including (a) a housing defining an ear speaker, a microphone opening and a keypad, (b) a flip cover constructed to cover a portion of the housing, the flip cover being rotatably mounted on the housing to pivot between a closed position and an open position, and (c) a hinge assembly providing the rotatable mounting of the flip cover on the housing. The hinge assembly includes a hinge member retained within the housing, and a pair of hinge pins rotatably engaged at opposite ends of the hinge member and extending outwardly from the housing through apertures in the housing. The hinge pins are received by pin-receiving portions of the flip cover, and the pin-receiving portions are constructed so that rotation of the flip cover between the open and closed positions rotates the hinge pins. The housing includes a portion constructed to cause the flip cover to disengage from the housing, without damage to the flip cover, when the flip cover is rotated beyond its normal open position.

17 Claims, 6 Drawing Sheets

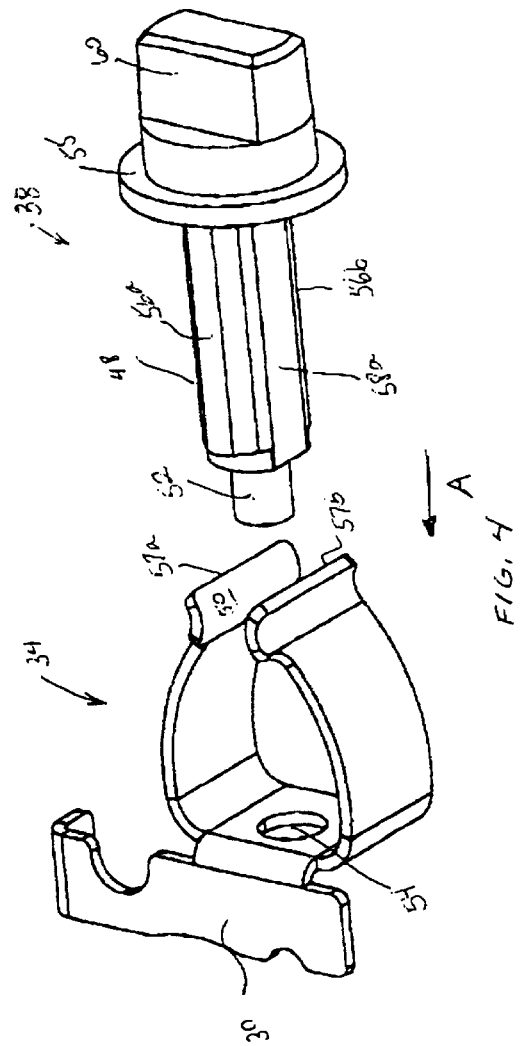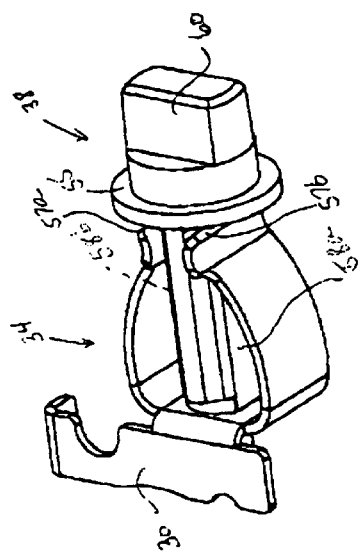

TELEPHONE HAVING A KEYPAD COVER

BACKGROUND OF THE INVENTION

The present invention relates to telephones having a keypad cover, i.e., cordless or cellular phones having a "flip" cover.

In the past few years, cellular phones ("cell phones") have become increasingly popular, in part due to improvements in the portability and convenience of these phones. Cellular phones now are generally compact, cordless units that in some cases are smaller than the handset of a conventional phone. Some cellular phones now include a "flip" cover, a flat cover that covers the keypad of the phone when the cover is in its closed position, and that pivots about a hinge at the base of the phone to an open position. The flip cover is provided both to protect the keypad of the phone and to provide the user of the phone with a sense that the user is "speaking into" the open flip cover (as the user of a conventional phone would speak into the lower portion of the handset). This latter function is thought to provide a certain sense of familiarity to users that are more accustomed to using conventional phones.

Other, non-cellular, cordless phones are also provided with flip covers for similar reasons.

One disadvantage of these flip covers is that the flip cover may be damaged if the cover is flexed beyond its normal position or if the phone is dropped while the flip cover is in the open position. This generally requires the user to replace either the flip cover or the entire phone, resulting in expense and inconvenience.

SUMMARY OF THE INVENTION

The present invention features a telephone, e.g., a cordless or cellular phone, having a "breakaway" flip cover, i.e., a flip cover that is designed to break off of the phone body without damage to the cover or body when the cover is flexed beyond its normal open position. The telephone also features a hinge design that is particularly simple and thus easy to manufacture and assemble and resistant to damage.

The invention features a telephone including (a) a housing, (b) a flip cover constructed to cover a portion of the housing, the flip cover being rotatably mounted on the housing to pivot between a closed position and an open position, and (c) a hinge assembly providing the rotatable mounting of the flip cover on the housing. The hinge assembly includes a hinge member retained within the housing, and a pair of hinge pins rotatably engaged at opposite ends of the hinge member and extending outwardly from the housing through apertures in the housing. The hinge pins are received by pin-receiving portions of the flip cover, and the pin-receiving portions are constructed so that rotation of the flip cover between the open and closed positions rotates the hinge pins. The housing includes a portion constructed to cause said flip cover to disengage from said housing, without damage to said flip cover, when said flip cover is rotated beyond its normal open position.

Preferred embodiments include one or more of the following features. The hinge member includes a pair of spring members, each spring member being constructed to resiliently engage a shaft portion of one of the hinge pins. The shaft portion includes a first pair of longitudinally extending flat surfaces positioned to releasably engage flat surfaces of the spring member when the flip cover is in its open position. The shaft portion further includes a second pair of longitudinally extending flat surfaces positioned to releasably engage the flat surfaces of the spring member when the flip cover is in its closed position. The surface of the shaft portion between the first and second pairs of flat surfaces is semi-cylindrical. Each hinge pin further includes a cylindrical end portion and each spring member includes an aperture for receiving the cylindrical end portion in rotatable engagement. Each hinge pin includes a keyed tab and each pin-receiving portion includes an opening shaped to receive the keyed tab in a manner so as to prevent relative rotation of the hinge pin with respect to the flip cover. The housing includes a land region constructed to disengage the pin-receiving portions from the hinge pins when the flip cover is rotated beyond the predetermined normal open position. The housing further comprises, adjacent the land region, a curved surface constructed to allow the pin-receiving portions to rotate freely when the flip cover is moved between the closed and the normal open positions. The land region is substantially planar. In the predetermined normal position, the flip cover forms an angle of from about 125 to 145 degrees with the housing.

Other features and advantages of the invention will be apparent from the drawings, the Description of the Preferred Embodiments, and from the claims.

BRIEF DESCRIPTION OF THE DRAWINGS

FIGS. 4 and 4A are enlarged perspective views showing the assembly of the hinge pin into the spring member.

DETAILED DESCRIPTION OF THE PREFERRED EMBODIMENTS

Figure 2A:
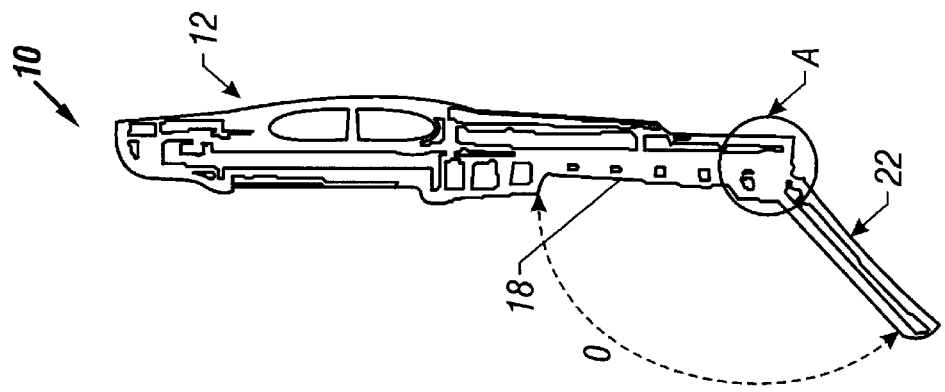
FIG. 2A is a side cross-sectional view of the telephone, taken along line A—A in FIG. 2.
Figure 2:
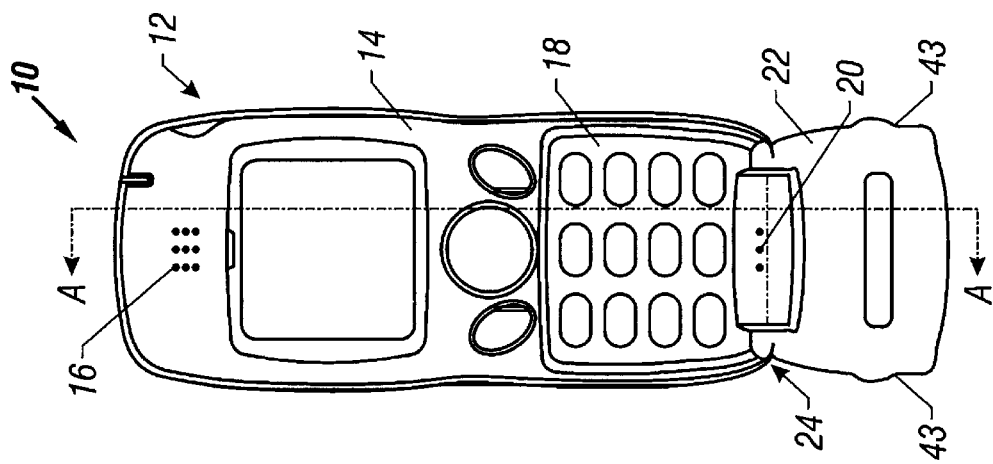
FIG. 2 is a front view of the telephone of FIG. 1, with the flip cover in the open position.
Figure 1:
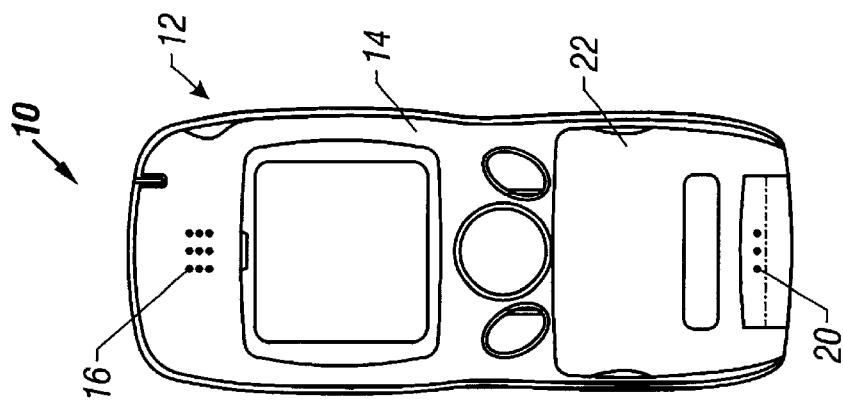
FIG. 1 is a front view of a telephone according to one aspect of the invention, with the flip cover in the closed position.

Referring to FIGS. 1 and 2, telephone 10 includes a phone body 12 having a housing 14 that defines an ear speaker 16, a keypad 18 and a microphone opening 20. A flip cover 22 is rotatably mounted on the phone body in the vicinity of the microphone opening 20 by a hinge assembly 24. Flip cover 22 rotates between a closed position (FIG. 1) and an open position (FIGS. 2 and 2a), and is releasably held in each position by a detent, as will be explained below with reference to FIGS. 4–4A. In the open position, flip cover is releasably held at a predetermined angle O relative to the phone body. Angle O is preferably from about 125 to 145 degrees, most preferably about 135 degrees. When the flip cover is rotated past its normal open position, it will releasably "break away" from the phone body, as will be explained in detail below with reference to FIGS. 6–6A.

Figure 3:
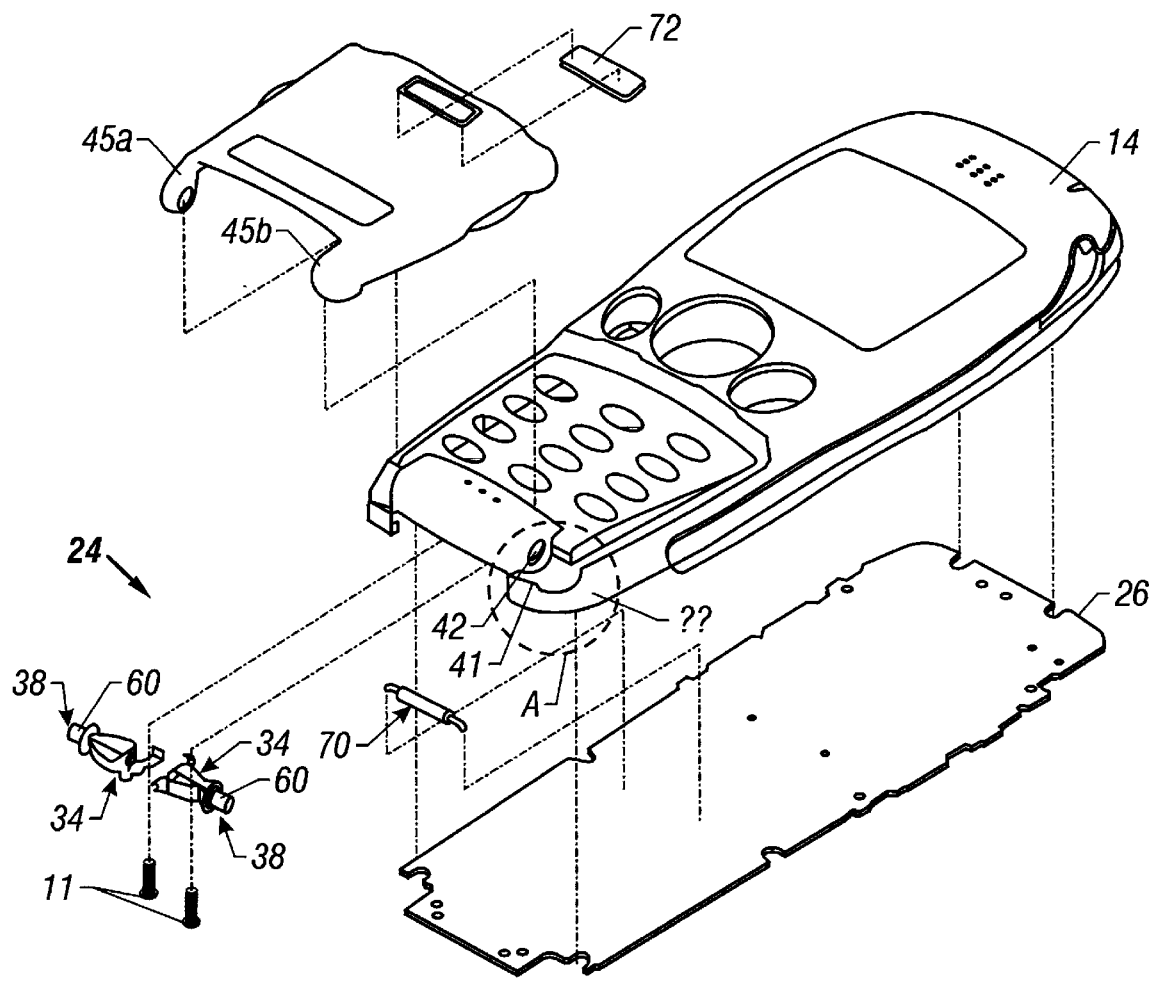
FIG. 3 is an exploded perspective view of the telephone of FIG. 1, with dotted lines indicating how the exploded parts are assembled.

Referring now to FIG. 3, hinge assembly 24 includes a pair of spring members 34, extending in opposite directions when assembled as indicated by the dotted lines, and a pair of pins 38 received by the spring members. This hinge assembly is easily assembled during manufacturing, using the following procedure.

First, hinge pins 38 are assembled with spring members 34 as shown in FIGS. 4–4a. Pins 38 are moved in the direction of arrow A in FIG. 4, to their engaged position, shown in FIG. 4A. When pin 38 is moved in direction A, shaft 48 of pin 38 engages the curved surfaces 50 of spring member 34, causing them to resiliently deflect. Pin 38 then slides in direction A until cylindrical end 52 is received by aperture 54 in the spring member and flange 55 engages ends 57a, 57b of the spring member. In this assembled position, shown in FIG. 4A, pin 38 can rotate freely within the spring member.

Next, spring members 34 are inserted between the circuit board 26 and housing 14, and secured by threading screws 11 into bosses (not shown) on the underside of housing 14, as indicated by the dotted lines in FIG. 3. Then, pins 38 are inserted through apertures 42 in housing 14, so that the pins extend out of the housing from these apertures. Next, pins 38 are inserted into apertures 44, 46 in arms 45a, 45b of flip cover 22, to pivotably mount the flip cover 22 on the housing 14.

Each of the hinge pins 38 includes a tab 60 that fits into an opening of corresponding shape in apertures 44, 46 of flip cover 22. The engagement of this tab in the keyed opening prevents the pin 38 from rotating with respect to flip cover 22, and thus allows pin 38 to efficiently effect rotation of the flip cover.

Figure 3A:
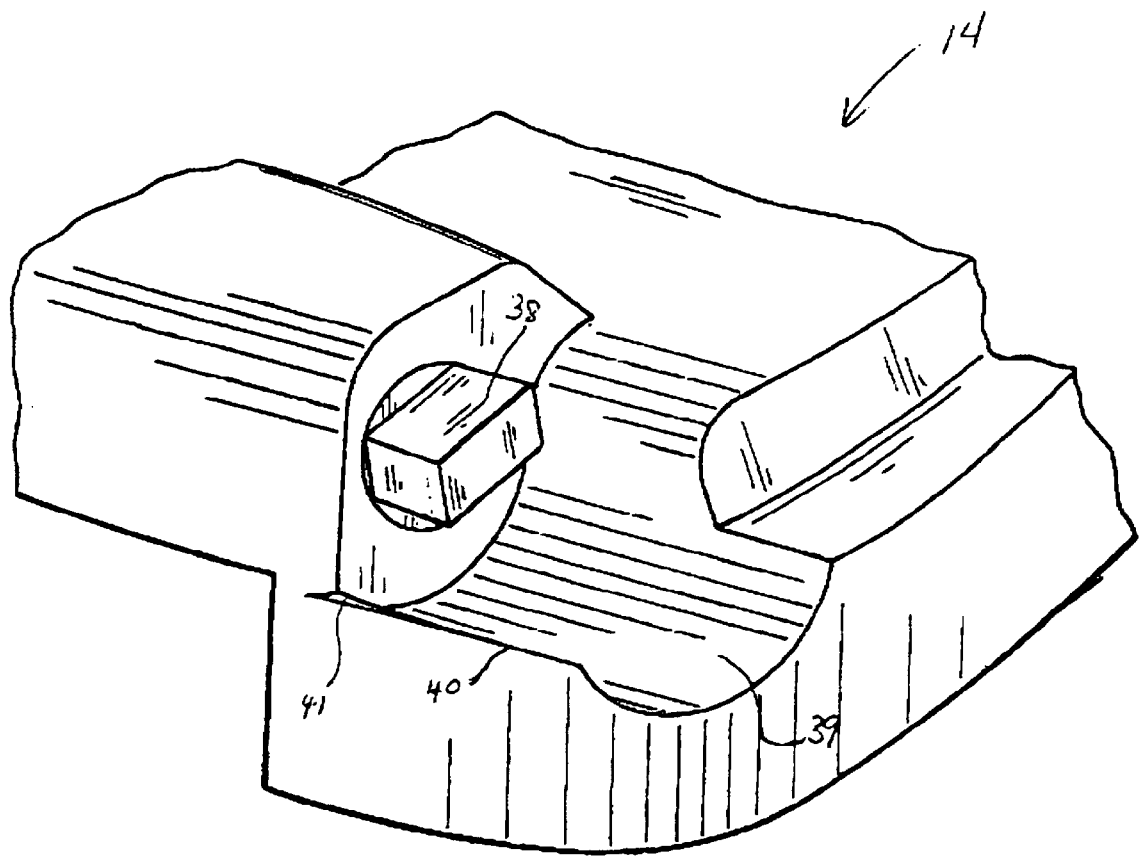
FIGS. 3A and 3B are highly enlarged detail views of area A in FIG. 3, with 3A being a perspective view and 3B being a planar view.
Figure 3B:
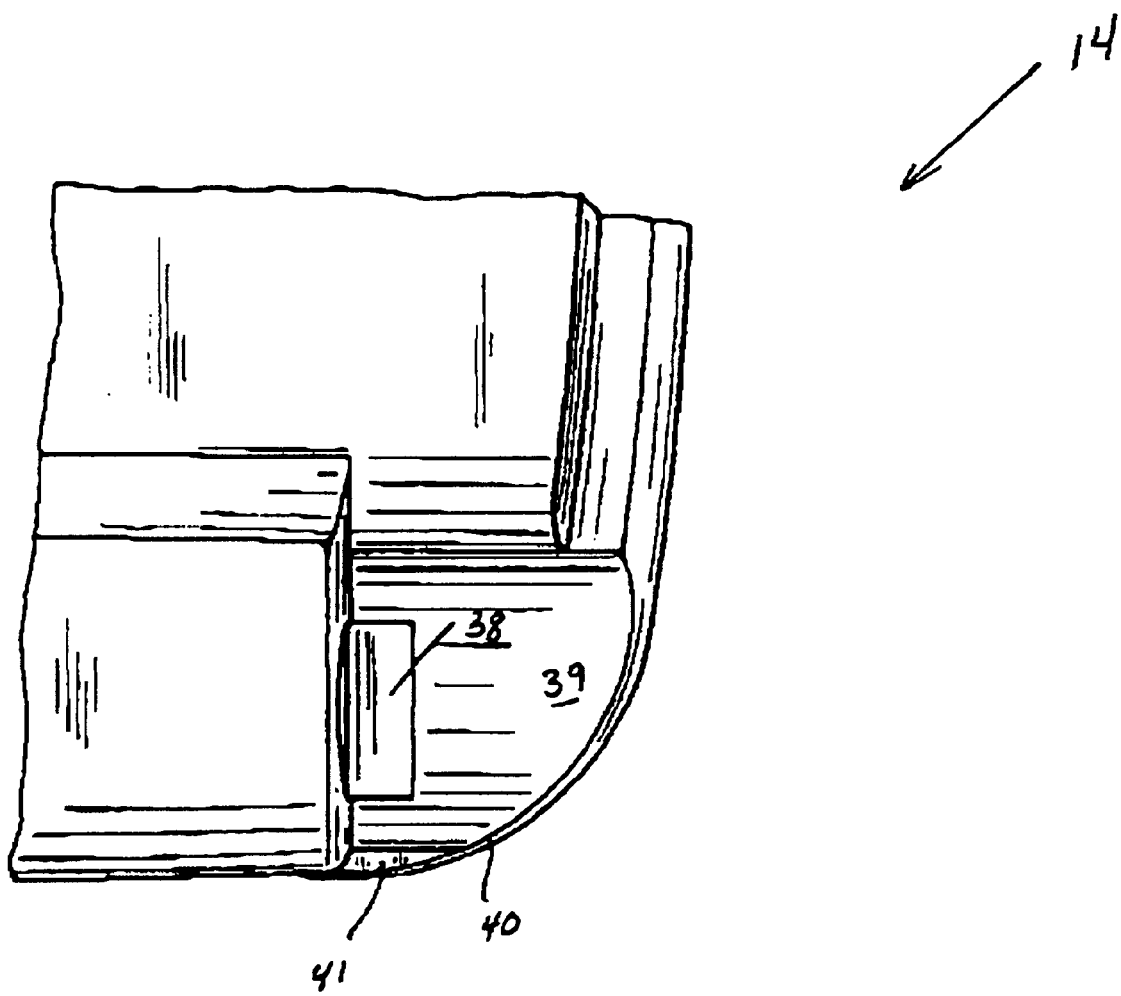
Figure 3C:
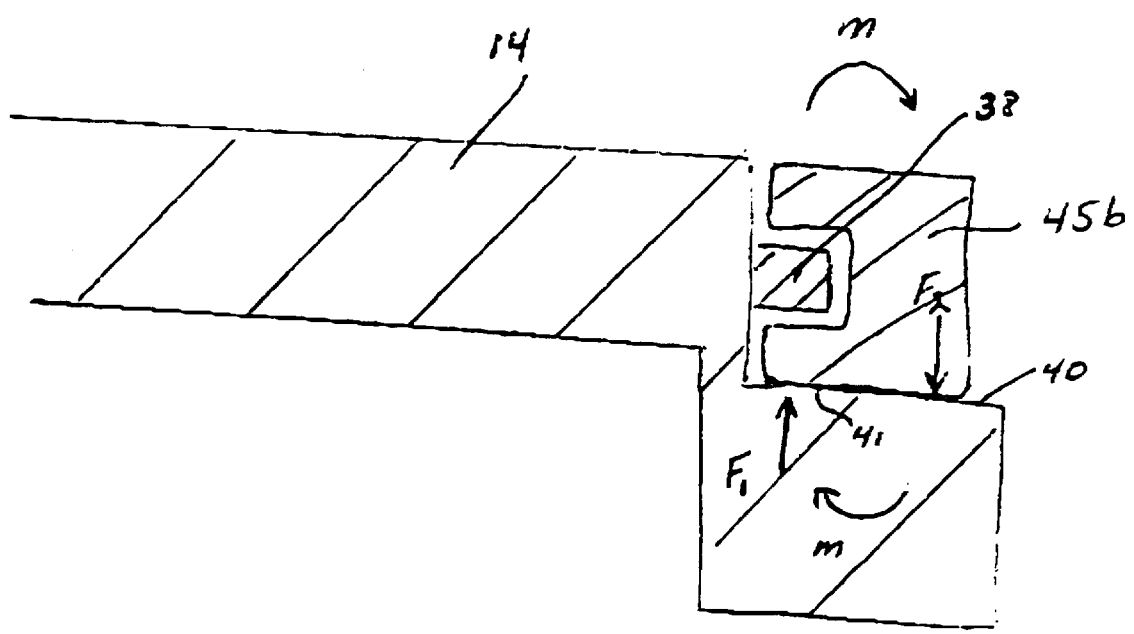
FIG. 3C is a front cross-sectional view of area A, taken through the longitudinal axis of pins 38.

The flip cover 22 is mounted on the housing in a manner so that the flip cover will "break away" from the housing, without damage to the flip cover, when the flip cover is flexed beyond its normal position. Housing 14 includes a curved surface 39, over which the curved surface of arms 45a, 45b can smoothly slide when the flip cover is rotated from the closed position to the open position. When the flip cover is rotated beyond its normal open position, arms 45a, 45b are forced against edge 40 and substantially planar land 41 of housing 14 (see FIGS. 3A and 3B). When the cover is rotated further, the downward force applied to the stiff longitudinal edges 43 of the cover (see FIG. 2) translate this force to a downward force $F_2$ applied to the edge 40 and land 41 (see $F_2$ in FIG. 3C). Simultaneously, land 41 acts as a fulcrum, exerting an upward force $F_1$ on the arms 45a, 45b. Forces $F_1$ and $F_2$ together create a bending moment (arrow M) which causes the arms 45a, 45b (which are typically formed of a flexible plastic material) to deflect in the direction of the bending moment. When sufficient force is applied, the arms will simply pop off of the hinge pins and thus be disengaged from the housing 14. The hinge pins remain in place, trapped between the spring members 34 and the housing 14. To replace the flip cover 22, the user need only pop the hinge pins back into place in apertures 44, 46 of flip cover 22.

As mentioned above, the hinge assembly includes two detents to releasably hold the flip cover 22 in its closed and open positions. As shown in FIGS. 4–4A, pins 38 each include two pairs of flat surfaces 56a, 56b and 58a, 58b that extend longitudinally along shaft 48. The two flat surfaces of each pair are positioned on opposite sides of the pin. The remainder of the surface of the shaft, between the flat surfaces, is semi-cylindrical. One pair of flat surfaces resiliently engages surfaces 50 of the spring member when the flip cover is in its closed position, while the other pair resiliently engages surfaces 50 when the flip cover is in its closed position. Thus, the pairs of flat surfaces act as a detent to releasably retain the cover in these positions. When the flip cover is moved between these detent positions, the spring member resiliently deflects and the pin rotates smoothly over the portion of its surface that is semi-cylindrical.

If desired, the phone may be constructed to be activated/deactivated by opening and closing the flip cover 22. This may be accomplished using any standard flip activation device, for example a conventional magnet/reed switch assembly 70 on the housing 14 and a magnet 72 on the flip cover 22, as shown in FIG. 3.

Other embodiments are within the claims. For example, while the flat surfaces on shaft 48 are shown as extending continuously along the entire length of the shaft, these surfaces can instead be short surfaces positioned to engage ends 57a, 57b of the spring member, and the remainder of the shaft can be cylindrical.

What is claimed is:

1. A telephone comprising:
   a housing,
   a flip cover constructed to cover a portion of said housing, the flip cover being rotatably mounted on said housing to pivot between a closed position and an open position, and
   a hinge assembly providing said rotatable mounting of said flip cover on said housing, said hinge assembly comprising
      a hinge member retained within the housing, and
      a pair of hinge pins rotatably engaged at opposite ends of the hinge member and extending outwardly from said housing, said hinge pins being received by pin-receiving portions of said flip cover, said pin-receiving portions being constructed so that rotation of said flip cover between said open and closed positions rotates said hinge pins,
   wherein said housing includes a portion shaped and positioned to cause said flip cover to disengage from said housing, without damage to said flip cover, when said flip cover is rotated beyond its normal open position.

2. The telephone of claim 1 wherein said portion of said housing is positioned to cause said pin-receiving portions to flex outwardly and disengage said hinge pins when said flip cover is rotated beyond its normal open position.

3. The telephone of claim 1 wherein said hinge pins extend outwardly through apertures in said housing.

4. The telephone of claim 1 wherein said hinge member includes a pair of spring members, each spring member being constructed to resiliently engage a shaft portion of one of said hinge pins.

5. The telephone of claim 4 wherein said shaft portion includes a first pair of longitudinally extending generally flat surfaces positioned to releasably engage generally flat surfaces of said spring member when said flip cover is in its open position.

6. The telephone of claim 5 wherein said shaft portion further includes a second pair of longitudinally extending generally flat surfaces positioned to releasably engage said generally flat surfaces of said spring member when said flip cover is in its closed position.

7. The telephone of claim 6 wherein the surface of said shaft portion between said first and second pairs of generally flat surfaces is approximately semi-cylindrical.

8. The telephone of claim 4 wherein each hinge pin further includes a cylindrical end portion and each spring member includes an aperture for receiving said cylindrical end portion in rotatable engagement.

9. The telephone of claim 1 wherein each hinge pin includes a keyed tab and each pin-receiving portion includes an opening shaped to receive the keyed tab in a manner so as to prevent relative rotation of the hinge pin with respect to the flip cover.

10. The telephone of claim 1 wherein said portion of said housing includes a land region constructed to act as a fulcrum, causing said pin-receiving portions to deflect and thereby disengage from said hinge pins when said flip cover is rotated beyond said predetermined normal open position.

11. The telephone of claim 10 wherein said housing further comprises, adjacent said land region, a cut-away portion constructed to allow said pin-receiving portions to rotate freely when said flip cover is moved between said closed and said normal open positions.

12. The telephone of claim 10 wherein said land region is substantially planar.

13. The telephone of claim 10 wherein, in said predetermined normal position, the flip cover forms an angle of from about 125 to 145 degrees with said housing.

14. The telephone of claim 10 wherein the longitudinal edges of said flip cover are sufficiently stiff to translate a rotational force applied to the flip cover to a downward force applied to said land region.

15. The telephone of claim 14 wherein said pin-receiving portions are sufficiently flexible to flex outwardly when said downward force acts on said fulcrum.

16. The telephone of claim 15 wherein said pin-receiving portions are constructed to resiliently pop off of said hinge pins, disengaging said flip cover from said housing.

17. The telephone of claim 16 wherein said pin-receiving portions are constructed to resiliently deflect to receive said hinge pins, allowing a user to reattach said flip cover after the flip cover has been disengaged from said housing.

* * * * *